United States Patent [19]

Sasaki et al.

[11] 4,410,013
[45] Oct. 18, 1983

[54] COMPOSITE DUAL TUBING

[75] Inventors: Takesada Sasaki, Machida; Hiroshi Endo, Zama; Yoshimasa Zama, Sagamihara; Masahiko Shiraishi, Nakatsu; Yosinari Miura, Nakatsu; Masayuki Yamaguchi, Nakatsu, all of Japan

[73] Assignee: Nippon Steel Corporation, Tokyo, Japan

[21] Appl. No.: 300,397

[22] Filed: Sep. 8, 1981

[30] Foreign Application Priority Data

Sep. 9, 1980 [JP] Japan .............................. 55-125012
Sep. 12, 1980 [JP] Japan .............................. 55-126870

[51] Int. Cl.³ .............................................. F16L 9/14
[52] U.S. Cl. ................................... 138/149; 138/113; 138/114; 138/115; 138/148; 60/322
[58] Field of Search .............. 138/111, 113, 114, 148, 138/149, 115; 60/322

[56] References Cited

U.S. PATENT DOCUMENTS

| 326,242 | 9/1885 | Prosser | 138/148 |
|---|---|---|---|
| 400,094 | 3/1889 | Limont | 138/114 |
| 1,761,281 | 6/1930 | Taub | 138/114 |
| 3,133,612 | 5/1964 | Sailler | 138/148 X |
| 3,595,275 | 7/1971 | Steans et al. | 138/149 X |
| 3,880,194 | 4/1975 | McNeal | 138/148 X |
| 3,946,764 | 3/1976 | Hubbell | 138/149 X |
| 4,233,816 | 11/1980 | Hensley | 138/149 X |

*Primary Examiner*—James E. Bryant, III
*Attorney, Agent, or Firm*—Kenyon & Kenyon

[57] ABSTRACT

A steel tubing and more particularly a composite dual tubing which can be suitably used for an exhaust pipe capable of effectively reducing the radiated noise from the exhaust pipe of automobiles. A metallic dual tubing of the present invention comprises: lugs (20a); lugs (20a) and heat-resistant filler material (24); or, the spacer member (16) and the heat-resistant filler member (17).

3 Claims, 7 Drawing Figures

COMPOSITE DUAL TUBING

The present invention relates to a steel tubing and more particularly a composite dual tubing which can be suitably used for an exhaust pipe capable of effectively reducing the radiated noise from the exhaust pipe of automobiles.

In the automobiles, an exhaust pipe connects the exhaust manifold to the muffler and allows the exhaust gas having a high temperature and a pulsating pressure to pass therethrough. The exhaust pipe radiates therearound noise, which is generated by the mechanical vibration of an internal combustion engine and then transmitted via a flange and the like, as well as the noise which is generated by the vibration of the exhaust pipe itself due to the pulsating exhaust gas. The automobile noises are divided into a group of power source sounds and a group of travelling sounds. The former group is caused by the engine, the radiator fan, the exhaust gas and the like. The latter group is caused by the rotational contact of tyres with the road, the windage of an automobile body and the like. It is considered that the radiated noise from an exhaust pipe amounts of about 14% of the power source sounds. Research and development of steel tubings for the exhaust pipe proceeds, therefore, so as to reduce the radiated noise of the exhaust pipe and hence to provide automobiles with lower noises. The material of the exhaust pipe has been devised and the so developed ferritic stainless steel tubing for the exhaust pipe radiates reduced noise as compared with the radiated noise in the case of using the carbon steel exhaust pipes. The reduction effect of radiated noise is, however, not satisfactory and the exhaust pipe becomes expensive in the ferritic stainless steel exhaust pipe.

Most conventional exhaust pipes are made of a single steel tube and their soundproof effect is not appreciable, if any. The structure of the exhaust pipes has therefore been devised so as to decrease the radiated noise of such pipes. An example of the so devised and developed exhaust pipes is to use a dual tubing which may be also referred to as a double wall tubing.

The prior art is now described with reference to FIGS. 1 through 3.

Figure 1:
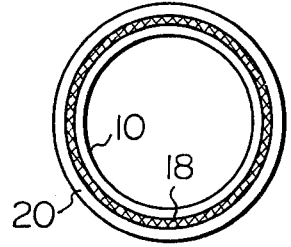
FIGS. 1 through 3 are views of known composite dual tubing for the exhaust pipe.
Figure 2:
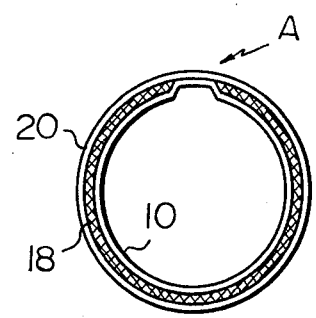
Figure 3:
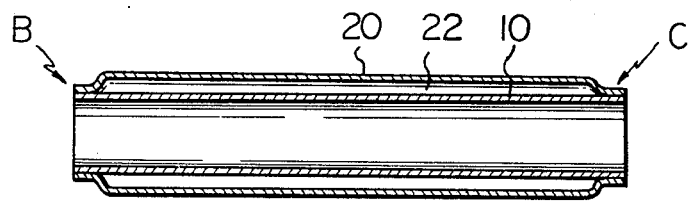

Referring to FIGS. 1 and 2, examples utilizing the noise reducing effect of the enclosure made of the sound-absorbing and heat-insulating material are illustrated. In FIGS. 1 and 2, the reference numerals 10, 18, and 20 designate an inner tube, the spacer member having a good sound-absorbing and heat-insulating property, such as asbestos and glass fiber, and an outer tube, respectively. In order to satisfactorily reduce the noise by the composite dual tubings shown in FIGS. 1 and 2, the sound-absorbing the heat-insulating material 12 must be very thick, so that the whole tubings become disadvantageously bulky. In addition, it is complicated to attach the sound-absorbing and heat-insulating material around the inner tube 10, because the exhaust pipe is curved. Namely, when the attachment of sound-absorbing and heat-insulating material is carried out by a winding method, the material must be manually wound around the inner tube and therefore this method is not likely to be adapted in the mass production of composite dual tubings. The composite dual tubing shown in FIG. 2 is different from that shown in FIG. 1 in the fact that the inner tube 10 and the outer tube 20 are directly in contact and secured or welded to one another at the portion A. The tubing shown in FIG. 3 is a dual tubing with a gap 22 which separates the inner tube 10 from the outer tube 20, and both tubes 10, 20 are secured to one another through portions B and C at the ends of the tubing. The dual tubings shown in FIGS. 1 and 2 turned out by the test by the present applicant to be effective occasionally for the reduction of radiated noise. However, such effect is drastically decreased when heating the dual tubings to a high temperature. The reduction effect of radiated noise of the dual tubing shown in FIG. 3 is only slightly thermally influenced, however, its reduction effect is not remarkable in the first place. In addition, since the inner and outer tubes must be secured to one another at the ends thereof or at an appropriate intermediate point between the ends, so as to prevent the inner tube from falling out of the outer tube during the tube handling, the working of tubes is disadvantageously complicated. Furthermore, when the dual tubing is subjected to bending, the inner and outer tubes are deformed so that the gap 22 may not be assured. In order to eliminate such problem, sand and the like are usually filled in the gap and then withdrawn from the gap after working of the tubes, which is a very complicated method.

It is, therefore, an object of the present invention, to improve the known tubing, so that the radiated noise from the composite dual tubing can be kept at a low level at normal temperature and especially at high temperature. The composite dual tubing according to the present invention must be manufactured by a simple and reliable method.

In accordance with the objects of the present invention, there is provided a metallic dual tubing comprising an inner tube and an outer tube, characterized in that the inner tube and the outer tube are in contact or welded with each other at a part thereof, and further at least one stripe of lug is formed on at least one of the outer surface of the inner tube and the inner surface of the outer tube. The at least one stripe of lug acts as a spacer between the inner and outer tubes.

There is also provided a metallic tubing comprising an inner tube, an outer tube and an intermediate layer inserted between these tubes, characterized in that said intermediate layer consists of a narrower spacer member and a wider heat-resistant filler member, said spacer member being in the form of a strip having a thickness of from about 0.2 to 0.5 mm, and extending in the longitudinal direction of the tubing, and said heat-resistant filler member consisting of material filled between the inner and outer tubes and having a thickness of from about 0.1 to 0.5 mm.

The preferred embodiments of the present invention are hereinafter described with reference to FIGS. 4 through 6.

Figure 4:
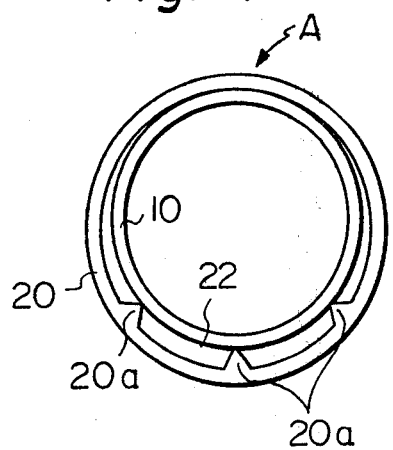
FIGS. 4 through 6 illustrate a view of the composite dual tubing according to embodiments of the present invention; and, FIG. 7 schematically illustrates a process for manufacturing the composite dual tubing.

Referring to FIG. 4, a preferred embodiment of the dual tubing with the lug according to the present invention is illustrated. In FIG. 4, three stripes of the lugs 20a are formed on the inner surface of the outer tube 20 and extend in the longitudinal direction of the inner and outer tubes 10 and 20, respectively. The inner tube 10 and the outer tube 20 are in contact with or welded to each other at the part thereof indicated by the symbol A. The lugs 20a are therefore formed at the half section of the dual tubing opposite to the half section where the tubes are in contact or welded. The lugs 20a form the spacers defining the gap 22 between the inner and outer tubes. The lugs 20a has a pointed cross sectional shape.

Figure 5:
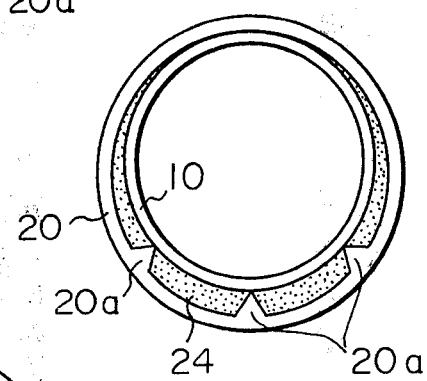

Referring to FIG. 5, a heat-resistant filler material 24 is disposed in the gap 22. Although the heat-resistant filler material is disposed entirely in the gap 22, it may be disposed at least partly, for example only between three lugs 20a in the gap 22.

The lugs 20a (FIGS. 4 and 5) have preferably a height of from about 0.1 to 0.5 mm. The number of the lugs 20a is not limited to three stripes but may be optional. A number of stripes of lugs may be arranged circumferentially and separately from one another. The lugs 20a (FIGS. 4 and 5) may be provided on the outer surface of the inner tube 10 or on both the outer and inner surfaces of the inner and outer tubes 10 and 20, respectively. As the heat-resistant filler material 24, such inorganic heat-resistant materials as, glass cloth, asbestos, ceramic wool and rock wool can be used. The diameter of the dual tubings is optional.

Figure 6:
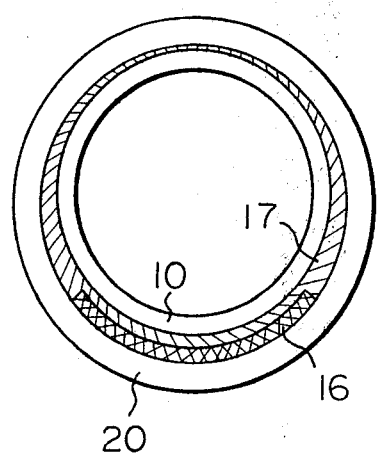

Referring to FIG. 6, a preferred embodiment of the dual tubing with the intermediate layer is illustrated. Between the inner tube 10 and the outer tube 20, the heat-resistant filler member 17 and the spacer member 16 are inserted. The heat-resistant filler member completely surrounds the inner tube 10 and consists of a heat-resistant material not damaged due to burning at a temperature, to which, for example, an exhaust pipe is heated. Such heat-resistant material is, for example, glass cloth, asbestos or ceramic fiber. The heat-resistant filler member 17 is filled in the annular space between the inner and outer tubes. In the process of filling the heat-resistant filler member should be compressed in such an appropriate degree as to not cause disappearance of the porosities, cavities or channels.

The spacer member 16 must be able to resist against the compression force which is applied to the dual tubing during the tube bending and the manufacturing of tubing. Provided that the spacer member 16 is resistant against the compression, the spacer member 16 may be organic or inorganic and also heat-resistant or combustible at a temperature, to which, for example, the exhaust pipe is heated. The width of the spacer member 16 is considerably smaller than the width of the heat-resistant filler member 17 or the circumferential length of the annular space between the inner and outer tubes. The spacer member 16 is therefore in the form of a strip extending in the longitudinal direction of the dual tubing. The spacer member 16 is a single strip or track in the drawing. However, a plurality of separated spacer members may be arranged. The thickness of the spacer member 16 is from 0.2 to 0.5 mm in the state where the spacer member is inserted and pressed between the inner and outer tubes. The thickness of the heat-resistant filler member 17 is from about 0.1 to 0.5 mm in the state where this member is inserted and pressed between the inner and outer tubes. The diameter of the composite dual tubing basically exerts no influence on how the thickness of the members 16, 17 mentioned above should be adjusted.

The inner tube 10 and outer tube 20 (FIGS. 4 through 6) may have the same wall-thickness. The wall-thickness of the outer tube 20 is preferably greater than that of the inner tube 10, in light of the fact that a flange may be welded to the outer tube.

Methods for manufacturing the composite dual tubing according to the present invention are now described.

Figure 7:
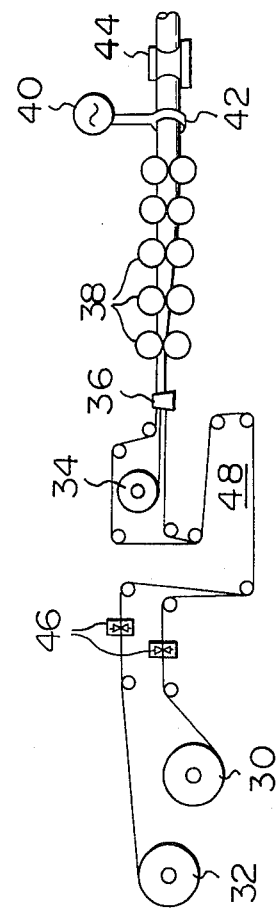

Referring to FIG. 7, the manufacturing method of the dual tubing as shown in FIG. 5 according to the electric tube-welding technique is illustrated. The manufacturing plant is provided with uncoilers 30 and 32 of strips for the outer and inner tubes, respectively, an uncoiler 34 of the heat-resistant filler material, such as a glass cloth, guide rolls 36, forming rolls 38, a high frequency-power source 40, a welding coil 42, squeezing rolls 44, a welding assembly 46 for a continuous supply of the strips, and a looper 48 which provides a supply of the strips even during welding. One or both of the strips are preliminarily provided with a stripe or stripes of lugs on the surface of one strip opposite to the other strip or the opposite surfaces of the strips. The strips for the inner and outer tubes are drawn out from the uncoilers 32 and 30, respectively. The glass cloth is drawn out from the uncoiler 34 and is fed into the space between these strips. The strips and the glass cloth are bent into the tubular form by the forming rolls 38 and subjected to a high frequency induction-heating by means of the welding coil 42. The high frequency induction-heated edges of the strips are bonded or welded at a common bead, while the strips are being pressed by the squeezing rolls 44.

The dual tubing shown in FIG. 4 can be manufactured by utilizing the process illustrated in FIG. 7. Obviously, the uncoiler 34 is not necessary.

The composite dual tubing shown in FIG. 6 can be manufactured by the tube reduction method. The heat-resistant filler member 17 is disposed around the outer circumference of the inner tube 10, and namely the inner tube 10 is enclosed by the heat-resistant filler member 17 having a width equal to the circumference of the inner tube 10 (FIG. 6). Alternately, the heat-resistant filler member may be wound around the inner tube 10, when the heat-resistant filler member 17 is in the form of tapes. The spacer member 16 is bonded on an appropriate position of the heat-resistant filler member 17. The inner tube 10 with both members 16 and 17 is inserted into the outer tube 20 (FIG. 6). And the diameter of the outer tube 20 is decreased by the tube reduction, thereby tightly pressing the outer tube 20 to the spacer membe 16 and the heat-resistant filler member 17. During the tube reduction, the heat-resistant filler member 17 is strongly compressed between the inner tube 10 and the spacer member 16, but, this member 17 is kept relatively loosely filled between the inner tube 10 and the outer tube 20 where the spacer member 16 is not situated.

The dual tubings shown in FIGS. 4 through 6 are subjected to bending, when they are used as the curved exhaust pipe. It is possible to prevent during bending by means of the lugs 20a (FIGS. 4 and 5) contact between the inner and outer tubes. When a number of separated lugs 20a are provided, the gap 22 is not reduced appreciably by the bending. In addition, it is possible to prevent by means of the heat-resistant filler member 17 (FIG. 6), which covers entirely or substantially entirely the inner tube 10, contact between the inner and outer tubes liable to be caused by the bending. This results in a low noise-radiation property.

The term of intermediate layer used hereinafter collectively designates the spacer member 18 (FIGS. 1 and 2), the spacer member 16, the heat-resistant filler member 17, (FIG. 6) and heat-resistant filler material 24 (FIG. 5).

Not only the methods described above but any optional method for manufacturing the composite tubings can be utilized for manufacturing the composite dual tubing according to the present invention.

The present invention is further explained by way of Examples.

EXAMPLE 1

In Table 1, below, illustrated are the results of testing the steel tubings according to the present invention numbered as Nos. 5 through 10 and other steel tubings acting as comparative samples numbered as Nos. 1 through 4, 11 and 12. The steel tubings were dual tubings except that the steel tubing of Sample No. 1 was a single or single wall tubing with a diameter of 65 mm and wall thickness of 2.4 mm. The diameter of the dual tubings according to Sample Nos. 2 through 7 was 65 mm and the wall thickness of the inner and outer tubes of these dual tubings was 1.2 mm. The diameter of the dual tubings according to Sample Nos. 8 through 12 was 89.1 mm, and the wall thicknesses of the outer and inner tubes were 1.6 mm and 1.0 mm, respectively. The symbol GC in Table 1 was the 0.2 mm thick glass cloth.

The test for measuring the radiated noise from the tubings was carried out as follows. The tubings having a length of 1000 mm were held at their ends by a carrying member comprising a clamp and a pivot. Some steel balls were placed on the inner wall of the tubings and struck against the inner wall of the tubings, while the tubings were rotated by means of the supporting member. The radiated nose was measured by a sound level meter located near the tubings. This method is so called an internal vibration method. The test was carried out at room temperature, the tubings provided for the test being indicated in the table by "As Formed", and at elevated temperatures of 600° C. 700° C. and 800° C. for 5 hours, respectively.

As is apparent from the table above, the noise from the single tubing of Sample 1 was the highest. Sample 2 for comparison purposes was provided with neither lugs nor filler material. The noise at "As Formed" of Sample 2 was 95.5 dB and higher than acceptable level of 95 dB, and the noise at elevated temperatures became higher. This is believed to be because the inner and outer tubes were in contact with one another at some parts thereof.

Sample No. 3 for the comparison purposes was not provided with lugs but comprised the 0.2 mm thick glass cloth densely filled between the inner and outer tubes. The noise was low at room temperature but high at elevated temperatures in Sample No. 3.

Sample Nos. 5 through 10 according to the present invention were characterized as compared with the other Samples by low radiated noise at both room and elevated temperatures.

Although Sample Nos. 4, 11 and 12 for the comparison purposes were provided with the lugs, the radiation noise was high. The lug(s) were low in Sample No. 4 and high in Sample Nos. 11 and 12.

The low noise radiation at elevated temperatures according to the characteristic of the present invention is very significant since the pipe flowing the exhaust gas therethrough is heated to a high temperature of from 600° to 800° C.

EXAMPLE 2

The procedure of Example 1 was repeated in order to test the noise radiation property of the dual tubings with the spacer member.

The dimensions of the steel tubes of Sample Nos. 13 through 16 were the same as in Sample Nos. 2 through 7. The dimensions of steel tubes of Sample Nos. 17 through 21 were the same as in Sample Nos. 8 through 12. The test results and structure of the tubings are explained with reference to Table 2.

| No. | | Lugs | | Sound Pressure Level by Internally Vibrating (dB) | | | |
|---|---|---|---|---|---|---|---|
| | | Height (mm) | Stripes | Filler Material | As Formed | 600° C. | 700° C. | 800° C. |
| 1 | (comparative) | — | — | — | 105 | 104 | 104 | 104.5 |
| 2 | (comparative) | — | — | — | 95.5 | 97 | 96 | 98 |
| 3 | (comparative) | — | — | GC | 91.5 | 98 | 97 | 97 |
| 4 | (comparative) | 0.05 | 3 | — | 94 | 96.5 | 96 | 97 |
| 5 | (invention) | 0.1 | 3 | — | 93 | 94 | 93.5 | 94 |
| 6 | (invention) | 0.2 | 1 | — | 92.5 | 93 | 92 | 92 |
| 7 | (invention) | 0.2 | 3 | — | 91.5 | 92 | 92 | 93.5 |
| 8 | (invention) | 0.4 | 1 | — | 92 | 92.5 | 92 | 93.5 |
| 9 | (invention) | 0.2 | 3 | GC | 90 | 90.5 | 91 | 91 |
| 10 | (invention) | 0.2 | 5 | GC | 88 | 88.5 | 88 | 89 |
| 11 | (comparative) | 0.6 | 1 | — | 94.5 | 95.5 | 95 | 96 |
| 12 | (comparative) | 0.6 | 1 | GC | 93 | 95 | 95.5 | 95 |

| No. | Sample No. | Intermediate Layer | | | | Sound-Pressure Level by Internally Vibrating (dB) | | | |
|---|---|---|---|---|---|---|---|---|---|
| | | Heat-Resistant Filler Member | | Spacer Member | | | | | |
| | | Thickness (mm) | Filler Material | Dimension (mm) | Spacer Material | As Formed | 600° C. | 700° C. | 800° C. |
| 1 | (Comparative) | — | — | — | — | 105 | 104 | 104 | 104.5 |
| 2 | (Comparative) | — | — | — | — | 95.5 | 97 | 96 | 98 |
| 13 | (Comparative) | 0.2 | Glass Cloth | — | — | 91.5 | 98 | 97 | 97 |
| 14 | (Invention) | 0.2 | Glass Cloth | 10 w × 0.2 t | Glass Cloth | 91 | 91.5 | 91 | 92 |
| 15 | (Invention) | 0.2 | Glass Cloth | 10 w × 0.5 t | Metallic Mesh | 92 | 92.5 | 91.5 | 91 |
| 16 | (Invention) | 0.5 | Ceramic Fiber | 10 w × 0.2 t | Steel Foil | 92 | 93 | 92.5 | 94 |
| 17 | (Invention) | 0.5 | Ceramic Fiber | 0.5 | Three Wires | 92.5 | 92.5 | 92 | 92 |

-continued

| | | Intermediate Layer | | | Sound-Pressure Level by Internally Vibrating (dB) | | | |
| | | Heat-Resistant Filler Member | | Spacer Member | | | | | |
| No. | Sample No. | Thickness (mm) | Filler Material | Dimension (mm) (diameter) | Spacer Material | As Formed | 600° C. | 700° C. | 800° C. |
| --- | --- | --- | --- | --- | --- | --- | --- | --- | --- |
| 18 | (Invention) | 0.2 | Glass Cloth | 10 w × 0.5 t | Polyester | 91.5 | 89 | 89 | 89 |
| 19 | (Comparative) | 0.2 | Glass Cloth | 10 w × 1.0 t | Metallic Mesh | 92.5 | 95.5 | 95 | 96 |
| 20 | (Comparative) | 0.5 | Ceramic Fiber | 10 w × 0.7 t | Glass Cloth | 92.5 | 95 | 96 | 95.5 |
| 21 | (Comparative) | 0.2 | Glass Cloth | 10 w × 0.1 t | Three Ceramic Fibers | 93 | 97 | 96.5 | 98 |

Note: w — width; and, t — thickness

In Table 2, the results of Sample Nos. 1 and 2 are reproduced so as to facilitate the comparison of these results with those of dual tubings with the spacer member.

In Sample No. 13 a 0.2 mm thick glass cloth was inserted between the inner and outer tubes around essentially the entire circumference. The noise reduction property of Sample No. 13 was good at normal temperature, but the radiated sound became high at elevated temperatures.

In Sample Nos. 14 through 18 of the present invention, the 0.2 mm thick glass cloth (Sample Nos. 14, 15 and 18) or the 0.5 mm thick ceramic fiber (Sample Nos. 16 and 17) was inserted between the inner and outer tubes around the entire circumference as the heat-resistant filler member. In addition, between the heat-resistant filler member and the outer tube inserted were the glass cloth (Sample No. 14), the metallic mesh (Sample No. 15), the steel foil (Sample No. 16), the three wires (Sample No. 17), and the polyester (Sample No. 18), having the dimension given in Table 2. The noise radiation of Sample Nos. 14 through 17 was good both at normal temperature and elevated temperatures. The noise-reduction property of Sample Nos. 19 through 21 was poor, because the thickness of the insert member was too large in Sample Nos. 19 and 20 and was too small in Sample No. 21.

The low noise radiation of the dual tubing according to the present invention can be explained as follows.

The lug or intermediate layer according to the present invention has a function of the vibration attenuator or the vibration damper and attenuates or damps the vibration of the inner and outer tubes. Namely, when the inner and outer tubes vibrate, the lug or intermediate layer is caused to slide or frictionally be displaced with respect to the tube(s), with the consequence that the vibration of the tubes is damped. The lug or intermediate layer does not only have the sound absorbing and insulation function as the intermediate layer in the conventional tubings shown in FIGS. 1 and 2 but also have the sound damping effect which effectively decreases the radiated noise at elevated temperatures. In addition, since the vibration of the tubings is suppressed, it is possible to suppress both noise which results from the pulsating exhaust gas and noise which results from the vibration of the exhaust pipe due to the engine vibration transmitted to and radiated from the exhaust pipe.

The vibration damping by the intermediate layer is realized by deformability of the layer. If the intermediate layer were too compactly inserted between the inner and outer tubes under pressure to deform, the inner and outer tubes would be integrally combined with one another and thus would not be different from single tubing from the point of view of vibration. This could elucidate the reason why the dual tubings shown in FIGS. 1 and 2 and having the densely filled intermediate layer exhibit a relatively low noise-radiation property at normal temperature but radiates high level of noise at elevated temperatures. The conventional intermediate layer expands at elevated temperatures and is compressed strongly by the inner and outer tubes, with the consequence that the thus closely combined tubes behave integrally during the vibration. In this case, the intermediate layer does not accomplish the vibration damping. According to the research by the present inventor, the filling state of the intermediate layer is significant for the vibration damping. The intermediate layer should be relatively loosely filled in the annular gap, so that the inner and outer tubes vibrate independently upon each other and their vibration is damped. The intermediate layer according to the present invention can be very thin as compared with the conventional intermediate layer which has not the vibration damping function but the sound absorbing and sound insulating function. The intermediate layer according to the present invention is for example 1 mm or less. The dual tubing of the present invention is therefore hardly distinguishable from the single or single wall tubing from the appearance.

The desirable filling state of the intermediate layer is realized by the lug(s) in the dual tubing shown in FIG. 5. This lug(s) ensures the space between the inner and outer tubes and prevents the intermediate layer from being strongly compressed by the inner and outer tubes during manufacturing of the tube. In any tube-manufacturing processes the compression force is applied to the intermediate layer, but the lug(s) can prevent the intermediate layer from being densely filled between the tubes.

The desirable filling state of the heat-resistant filler member 17 is realized by the spacer member 16 in the dual tubing shown in FIG. 6. If, however, the spacer member 16 is very thick, the filling state of the heat-resistant filler member 17 is too loose to prevent the independent vibration of the inner and outer tubes. The inner and outer tubes thus vibrate without vibration damping. If the spacer member 17 is very thin, the heat-resistant filler member 17 is strongly compressed, which seems to result in integral behavior of both tubes during the vibration. The spacer member may be combustible. In this case, the spacer member should be left unburnt at the tube production and bending of the tubes. Although the spacer member, which is combustible, is burnt away at a high temperature, to which, for example, the exhaust pipe is heated, the heat-resistant filler member 17 is kept from being strongly compressed due to the compression force exerted on the tubes during their production and the heat-resistant filler member 17 satisfactorily retains the vibration damping effect.

The vibration damping is also realized by the lugs shown in FIG. 4, namely, without the intermediate layer. If the lugs are very low, the inner and outer tubes are very close to each other and both tubes behave like an integral tubing during the vibration. On the other hand, if the lugs are very high, the inner and outer tubes vibrate indipendently of each other without vibration damping. The lug(s) should have a height of from about 0.1 to 0.5 mm.

We claim:

1. An exhaust pipe for high temperature waste gas from an automobile engine, said exhaust pipe comprising a metal dual tubing characterized in that said metal dual tubing comprises an inner tube and an outer tube which are in contact with each other along substantially the entire longitudinal length of the tubing and further at least one stripe of lug contacts the outer surface of said inner tube and the inner surface of said outer tube, said at least one stripe of lug extending substantially the entire longitudinal direction of the tubing, and said lug is located at the half section of the dual tubing opposite to the half section where the tubes are in contact.

2. An exhaust pipe according to claim 1, wherein a heat-resistant filler material is disposed in at least part of the gap between said inner tube and said outer tube.

3. An exhaust pipe according to claim 1 or 2, wherein said lug has a height of from about 0.1 to 0.5 mm.

* * * * *